Dec. 23, 1969 R. W. SANDERS ET AL 3,486,118

FM SWEEP SIGNAL DETECTION AND SIGNAL QUALITY EVALUATION CIRCUIT

Filed Dec. 28, 1966 4 Sheets-Sheet 1

INVENTORS
DONALD L. BRODERICK
GAROLD W. CURL
RAY W. SANDERS

BY John E. Wagner

INVENTORS
DONALD L. BRODERICK
GAROLD W. CURL
RAY W. SANDERS
BY
John E. Wagner

INVENTORS
DONALD L. BRODERICK
GAROLD W. CURL
RAY W. SANDERS
BY John E. Wagner

FM SWEEP SIGNAL DETECTION AND SIGNAL QUALITY EVALUATION CIRCUIT

Filed Dec. 28, 1966 4 Sheets-Sheet 4

INVENTORS
DONALD L. BRODERICK
GAROLD W. CURL
RAY W. SANDERS
BY John E. Wagner

United States Patent Office 3,486,118
Patented Dec. 23, 1969

3,486,118

FM SWEEP SIGNAL DETECTION AND SIGNAL QUALITY EVALUATION CIRCUIT

Ray W. Sanders, Los Angeles, Donald L. Broderick, Arcadia, and Garold W. Curl, Pasadena, Calif., assignors, by mesne assignments, to Aerojet-General Corporation, El Monte, Calif., a corporation of Ohio Filed Dec. 28, 1966, Ser. No. 605,421
Int. Cl. H04b 7/00
U.S. Cl. 325—65 8 Claims

ABSTRACT OF THE DISCLOSURE

A system for determining which of a plurality of RF channels are suitable for communications, which utilizes a chirp signal sequentially interspersed in each channel voice modulation by the transmitter. In the receiver, chirp modulation exceeding a designated amplitude excites phase-locked loop threshold circuitry which tracks the chirp signal, measures its amplitude throughout its duration and energizes an indicator if the duration amplitude exceeds the threshold.

This invention relates to radio communication systems and more particularly to circuitry in a multi-channel system for determining which of several radio frequency channels are of useful quality for communications purposes.

In order to increase the reliability of radio communication systems, it has been a common practice to assign a number of communication channels at different carrier frequencies to a transmitting location and allow the selective use of whichiver channel provides the best communications link. This arrangement is particularly common in the high frequency 3 to 30 MC band, where seasonal and daily changes in ionospheric conditions greatly affect transmission.

Given a multi-channel system capability, the selection of the best channel at each transmission period can be time-consuming if done by trial-and-error method. Apparatus has been designed specifically for facilitating channel selection. One such approach involves the use of a radar back scatter measurement of the ionosphere which gives an indication of the current transmission characteristics allowing selection of the best channel. Other techniques involve the use of one or two-way sounders or tone modulation schemes. Despite these previous attempts to provide effective channel selection, there exists a continuing need for a simple channel evaluator which does not intefere with normal voice transmissions and gives a virtually continuous indication of the usable channels available.

Therefore, one general object of this invention is to improve communication channel selection.

Another object is to provide periodic testing of all channels of a multi-channel communication system and a continuous indication of the usable channels.

One other object of this invention is to provide such a system which not only tests each channel but derives a figure of merit for the entire bandwidth of each channel.

Still another object of this invention is to provide a channel evaluation system which is capable of detecting selective fading of channels.

These objects are all attained by this invention which comprises basically at the transmitting station a generator for short duration variable frequency "chirp" signals which are injected periodically into the speech channel. Each receiving station contains in addition to the normal receiving equipment, a receiver which detects the chirp signal if it exceeds a predetermined amplitude and employs a phase-lock loop circuit to track it in frequency.

If the receiver maintains frequency lock for the duration of the chirp signal, logic circuitry enables an indicator which indicates channel acceptability.

One feature of this invention involves the generation, transmission and phase-lock demodulation of a variable frequency or chirp signal as an indication of radio transmission channel quality.

Another feature of this invention resides in the use of an amplitude threshold in combination with a phase-lock loop circuit for detecting and evaluating variable frequency signals.

Another feature of this invention relates to the presence of a phase-lock loop threshold circuit as well as an amplitude threshold circuit for evaluating an incoming variable frequency signal.

Another feature of this invention resides in the use of a phase-lock loop demodulator in combination with logic circuitry for detecting FM sweep functions indicative of channel quality.

These and other features of this invention may be more clearly understood from the following detailed description and by reference to the drawing in which.

Figure 1:
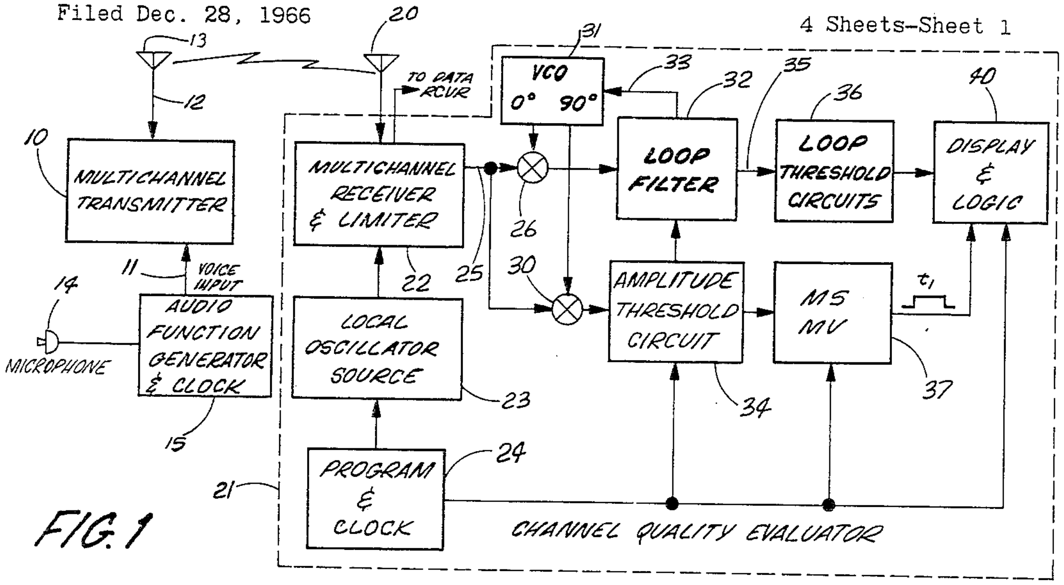
FIG. 1 is a simplified block diagram of a radio communications system incorporating this invention.
Figure 6:
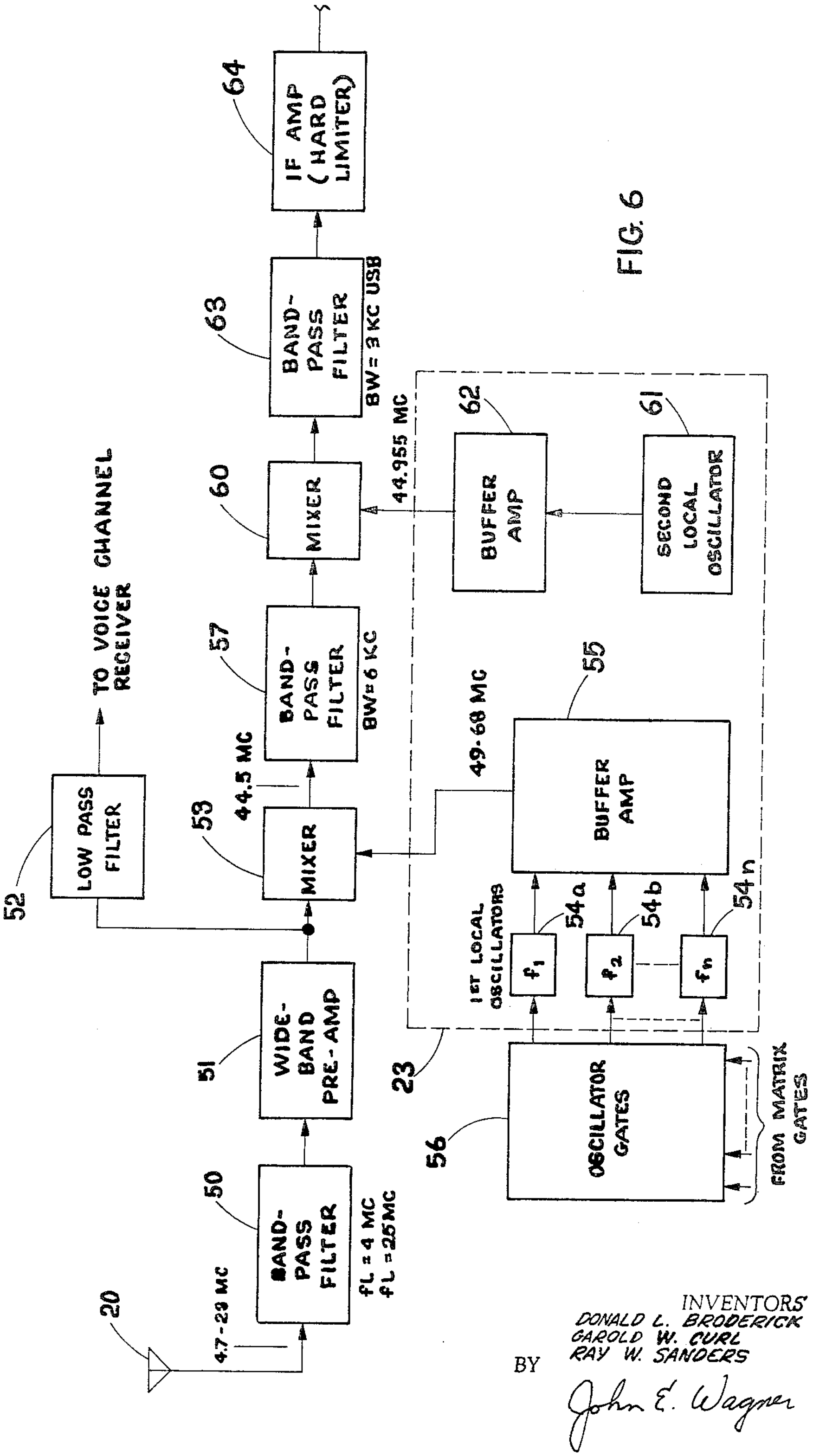
Figures 7, 8:
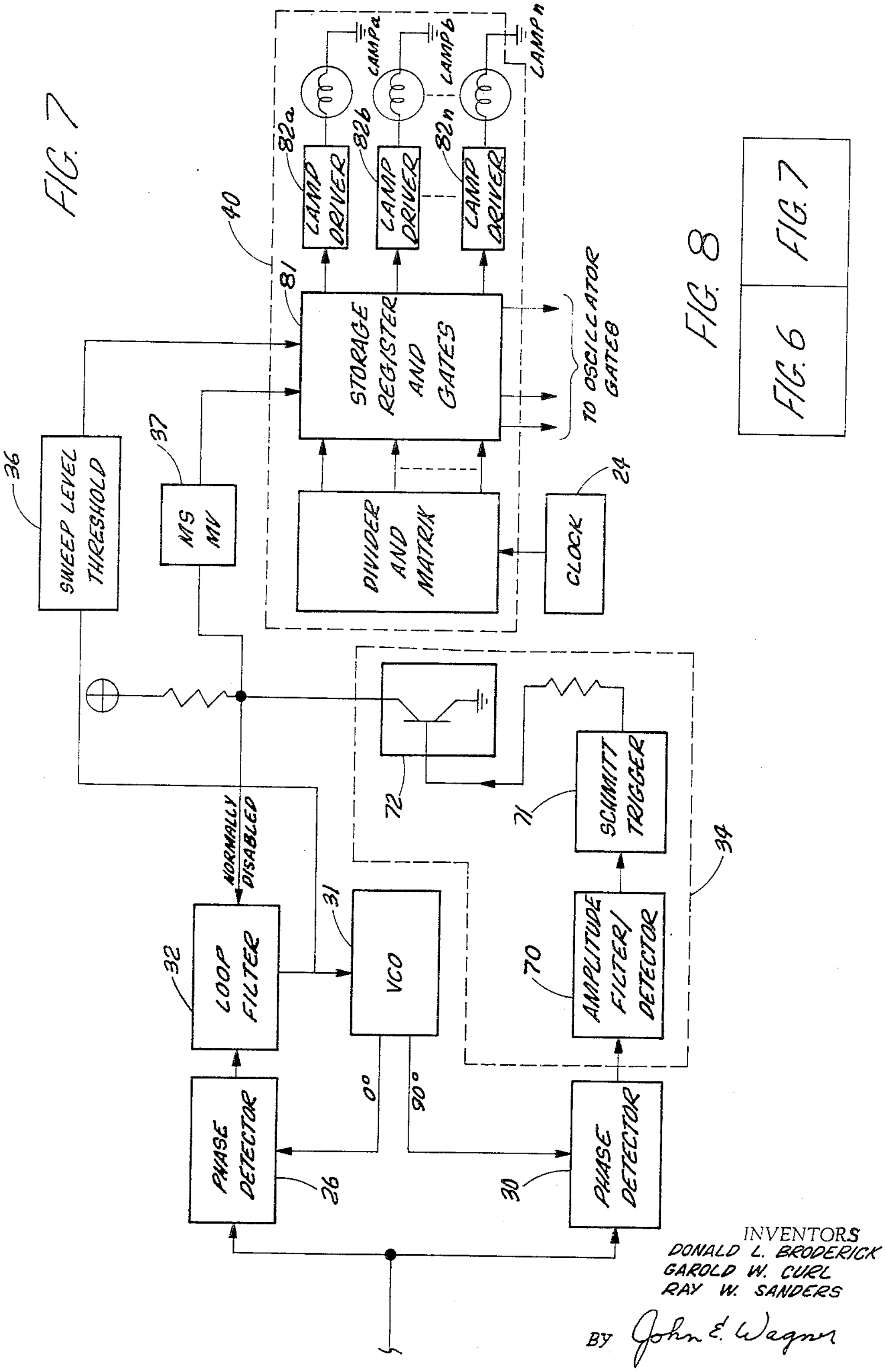

FIGS. 6 and 7 constitute a detailed block diagram of the channel quality evaluator of FIG. 1; and, FIG. 8 is an illustration of the arrangement of FIGS. 6 and 7.

Now referring to FIG. 1, a radio transmission system with channel evaluation is shown as including a transmitter 10 with an audio input 11 and an RF output 12 driving an antenna 13. Between a conventional microphone 14 and the transmitter 10 is an audio function generator and clock circuit 15 of this invention which is shown in more detail in FIG. 5.

The generator and clock circuit 15 is shown as interposed between the microphone 14 and the audio input to the transmitter 10. This arrangement is preferred so that a conventional multichannel transmitter can be operated using this invention merely by plugging the generator and clock circuit 15 into the transmitter microphone jack and the microphone into the circuit 15. The audio function generator and clock 15 may be self-contained and self-powered and easily removable when channel evaluation is not needed. The audio function generator and clock circuit 15 serves to produce a time-frequency varying signal herein termed the "chirp signal" of frequency range approximating the voice channel bandwidth (e.g. 300–3000 c.p.s.) and duration of 100 milliseconds or less. The clock portion of assembly 15 produces a gating pulse periodically, such as 1 pulse each nine seconds. The gating pulse momentarily interrupts the speech channel from the microphone and substitutes the "chirp signal."

At the receiving station, a conventional broadband antenna 20 is connected to the channel quality evaluator 21 of this invention. Data received is fed from a broadband, low-noise multicoupler circuit which is also the input stage of the multichannel receiver 22. The channel quality evaluator 21 includes as an input stage a step-tuned receiver and limiter 22 which is described in more detail below and shown in FIGS. 6 and 7. The receiver 22 is step-tuned to the center frequency of each of the channels in sequence in a cycle taking for example 10 seconds per channel times the number of channels to sample all channels in sequence by changing the frequency of a local oscillator 23 under the control of a program and clock assembly 24. The operation of the program and clock assembly and local oscillator source are likewise explained in more detail in connection with FIGS. 6 and 7. Suffice it to say in normal operation of the channel quality evaluator 21, the step-tuned receiver and limiter produces in sequence a hard-limited signal at the nominal center frequency of each channel in sequence on lead 25 where it is introduced into two mixers or phase comparators 26 and 30, to be mixed with the outputs of a single voltage-controlled oscillator 31 $f\angle\theta$ and $f\angle\theta+90$ respectively. The product of the mixer 26 is introduced into loop filter 32 tuned to pass unidirectional or low frequency voltages to the control input of the voltage controlled oscillator 31 over lead 33.

As just described, the interconnection of the mixer 26, loop filter 32 and voltage controlled oscillator 31, describes a classic phase-locked loop or tracking filter of the type disclosed in "Space Communications," edited by A. V. Balakrishnan, McGraw-Hill Book Company, New York, copyright 1963, chapter 8. However, in this invention the loop filter 32 is normally maintained in a shorted condition by an input from an amplitude threshold circuit 34 connected both to the mixer 30 and the program and clock assembly 24. The loop filter 32 normally maintained in a shorted condition causes the voltage controlled oscillator to be locked at a predetermined fixed frequency, for example 2700 cycles per second, which is in the range of the "chirp signal" of the system. This normal rest frequency of the voltage controlled oscillator is designed to be close to the starting frequency of the chirp signal, i.e. 3000 cycles per second.

Figure 2:
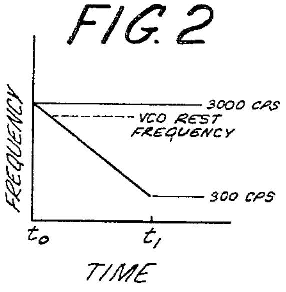
FIGS. 2 and 3 are graphical representations of the frequency-time and amplitude-time characteristics of the channel quality evaluation signal transmitted.
Figure 3:
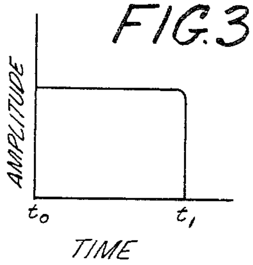
Figure 4:
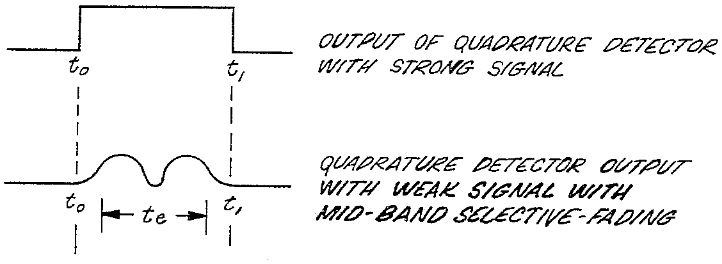
FIG. 4 is a graphical representation of the output of the channel evaluator with (*a*) an acceptable channel and (*b*) a channel with mid-frequency selective fading.

The frequency-time characteristic of a recommended chirp signal is illustrated in FIG. 2, while the ampltiude-time characteristic of the chirp signal is shown in FIG. 3. This signal sweeps across the modulation band of the transmitter at a constant signal amplitude. During chirp signal transmission as the voltage controlled oscillator rest frequency is crossed by the chirp signal, the phase-lock loop will attempt to lock onto the chirp signal and at the same time, the same signal from the receiver reaching mixer 30 produces an output to the amplitude threshold circuit which will indicate the presence of a coherent signal at the rest frequency.

If the signal-to-noise ratio of that coherent signal is great enough, the threshold will be exceeded and the threshold circuit 34 will remove the short from the loop filter 32, thereby allowing the voltage controlled oscillator to track the incoming frequency-time function of the incoming chirp signal. If the signal-to-noise ratio remains above the preset threshold for the remainder of the chirp signal sweep, the loop will be complete and operative and phase lock will be maintained for the remainder of the chirp signal. The loop signal from the loop filter 32 is fed by lead 35 to a loop threshold circuit 36 having one or two additional ampltiude thresholds both of which must be exceeded during a pre-selected time less than the duration of the chirp signal in order to register that a chirp signal of proper time duration and of adequate signal-to-noise ratio has been received. When these additional thresholds are exceeded, the loop threshold circuit 36 applies a pulse to the display and logic circuit 40, which indicates the channel is usable.

Both the loop threshold circuit 36 and display and logic circuit 40 are under the control of the program and clock assembly 24 so that each are operative simultaneously and reset at the end of each sampling period. Since amplitude threshold devices are insensitive to time variables, the system includes a monostable multivibrator 37 which is trigged by the amplitude threshold circuit 34 and produces a control pulse for the display and logic circuit. The pulse enables the display and logic circuitry for a brief period centered about the end of the sweep cycle of a valid signal, (time $t_1$). If the loop thresholds are exceeded during this period, the logic circuitry registers the reception of a valid evaluation signal and the appropriate display is energized. The display system incorporates a lamp or other indicator energized to indicate the usable channel. The display and logic assembly 40 is described in more detail in connection with FIG. 7.

Referring again to FIGS. 2 and 3, the chirp signal generated at the transmiter has two characteristics which are designed to facilitate channel evaluation. The signal sweeps over the full bandwidth of the channel in a significant period of time such as 100 milliseconds in order to give an indication of both time and selective frequency fading which might render the channel unusable. This is in contrast with previous systems which do not indicate full channel usability. Likewise, using the variable frequency characteristic allows the receiver to utilize the transient or lock-on characteristics of a phase-lock loop in determining the channel quality. It should be noted that in connection with FIG. 3 that the chirp signal maintains a constant amplitude despite variation of frequency and thereby allowing the amplitude threshold circuits of the receiver to be preset to a uniform amplitude.

Figure 5:
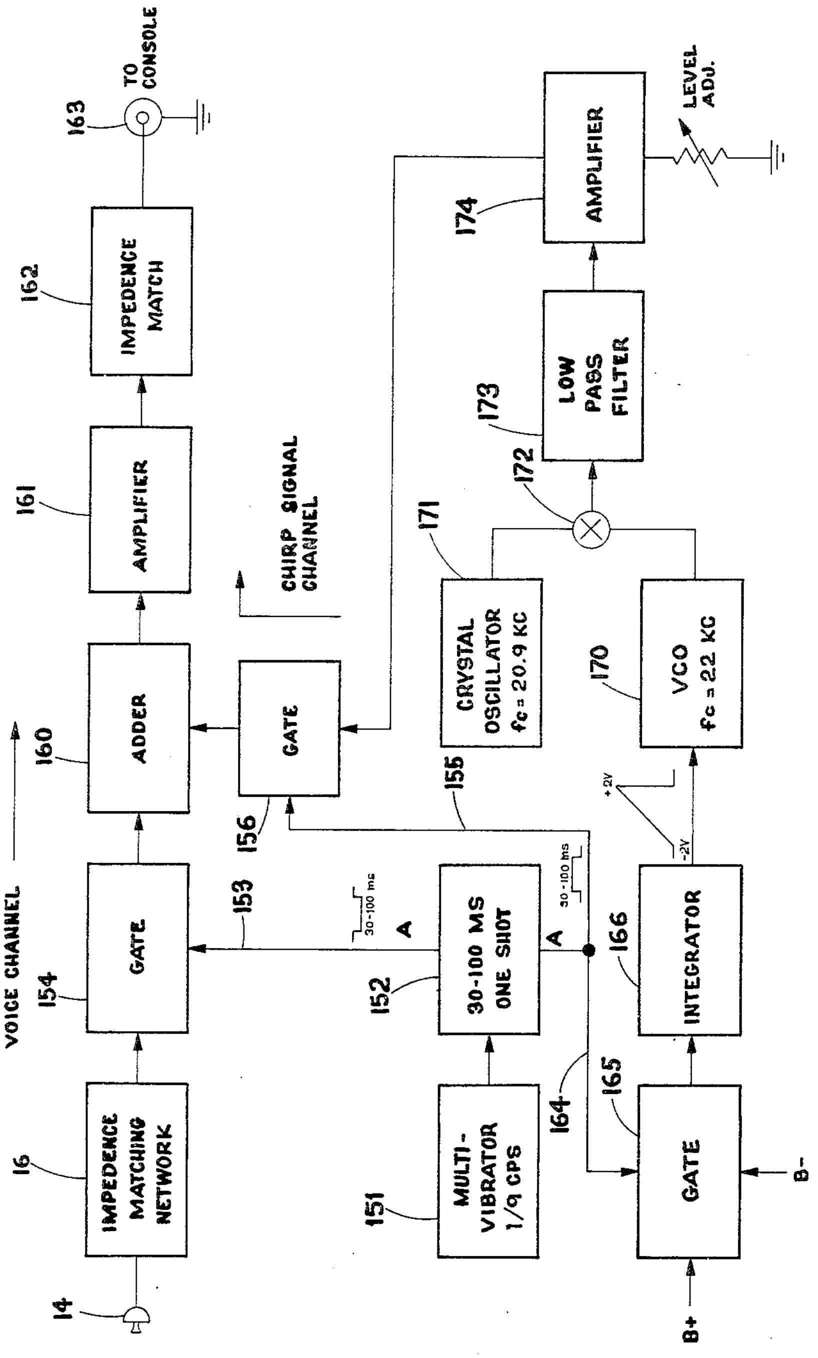
FIG. 5 is a block diagram of the audio function generator of FIG. 1.

Now referring to FIG. 5, the details of the audio function generator and clock 15 of FIG. 1 may be seen. The basic time function of the function generator and clock 15 comprises a free-running multi-vibrator 151 having a pre-selected pulse rate, for example 9 seconds per cycle, which provides a trigger pulse to a variable duration, one-shot multi-vibrator 152. The multi-vibrator 152 has two outputs, one inverted pulse over lead 153 to a gate 154 in the voice channel and a positive pulse output on lead 155 controlling a gate 146 in the chirp signal channel.

The conventional microphone designed for the transmitter 14 is connected through an impedance matching network 16 to the gate 154 which is designed to remain in a conducting condition to allow speech transmission at all times except during the period of chirp signal generation. Gates 154 and 156 are controlled to be alternately conducting whereby whichever signal passes through its conducting gate is combined in adder 160, amplified in amplifier 161, and then via impedance matching network 162, is applied to the output terminal 163 of the circuit 15.

The positive pulse from the one-shot multi-vibrator 152 is additionally applied over lead 164 to a gate 165 controlling an integrator 166, the latter of which produces a ramp function of length equal to the time duration of the one-shot multi-vibrator pulse and of suitable peak amplitude to drive a voltage controlled oscillator 170 over the selected chirp frequency range. In this particular case for convenience, the voltage controlled oscillator is selected from standard components designed to meet IRIG standards and nominally operates at 22 kilocycles per second. The voltage controlled oscillator frequency is converted to the selected audio frequency range of 3000 c.p.s. to 300 c.p.s. by mixing with the output of a stable crystal oscillator 171 in a mixer 172. Unwanted products of the mixing operation are removed by a low pass filter 173 having the required frequency pass band and the resultant chirp signal is amplified in amplifier 174 and applied to the gate 156.

The circuit 15 cyclically interrupts the speech path between the microphone 14 and the transmitter console to inject a swept frequency "chirp" signal of short duration into the transmission channel. Actual user tests show that a chirp signal of less than 100 ms. in length is not disturbing to the ordinary listener and does not result in any significant degradation of the voice channel communication efficiency.

The receiving station channel evaluator 21 of FIG. 1 is shown in more detail in FIGS. 6 and 7 in order to explain the concept of this invention more clearly. Incoming signals at the receiving antenna 20 are passed through a band-pass filter 50 designed to reject unwanted noise and signals and then amplified in a wide-band pre-amplifier 51 after which the received signal is introduced into the normal voice channel receiver and into the channel quality evaluator of this invention. The voice channel includes a low pass filter 52 designed to filter out the local oscillator frequencies of the channel evaluator signal. The composite speech plus channel merit signal is translated to a desired signal processing frequency, e.g. 44.5 mc./s. in a mixer 53 when combined with the output of the local oscillator 23. The latter actually includes a separate 1st local oscillator 54*a*–54*n* for each transmission channel of the system and a common buffer amplifier 55. The first local oscillators 54*a–n* are sequentially energized under control of a series of oscillator gates 56 and under control of the logic circuitry 40 of FIG. 7.

The first local oscillators 54*a–n* are always at a fixed frequency difference, e.g. 44.5 mc./s., above the desired signal frequency and are switched at a slower rate than the chirp signal generator rate. In a typical case, the chirp signal generator of FIG. 5 injects a signal into all channels simultaneously every nine seconds and the first local oscillators 54*a–n* of the receiver are energized in sequence for periods of 10 seconds each insuring coincidence with one chirp signal. Thus, no synchronization is required between transmitter and receiver. After a period of 80 seconds, an entire 8 channel system has been evaluated and the cycle can be repeated. With larger or smaller numbers of channels, the sampling period varies proportionately.

The translated signal from the mixer 53 is then passed through a narrow band-pass filter 57 and into a second mixer 60, where it is mixed with the amplifier output of a second oscillator 61. The second IF oscillator 61 is free-running at a frequency either above or below the first IF frequency to produce the selected second IF, e.g. 455 kc., a lower more usable frequency. The second IF is then filtered to remove the unwanted side band in a band-pass filter 63 and amplified in a hard limiting amplifier 64 which removes all amplitude variations prior to demodulation in the unique phase-locked loop circuit of this invention.

The limited signal is injected into the two phase comparators 26 and 30 of the channel quality evaluator 21.

As indicated above in connection with the description of FIG. 1, the voltage controlled oscillator 31 is normally held at a frequency near the beginning of the chirp signal sweep range. Whenever the received signal contains the rest frequency, its signal-to-noise ratio at that frequency is tested by the loop amplitude threshold circuit 34. This circuit 34 actually includes a filter and amplitude detector 70 producing a unidirectional varying voltage output proportional to the phase coherence of the voltage controlled oscillator output and the incoming signal. However, the transistor 72 normally provides a constant voltage input to the voltage controlled oscillator and maintains the loop filter network 32 disabled. The constant voltage input to the voltage controlled oscillator 31 holds the voltage controlled oscillator at or near its rest frequency.

A Schmitt trigger circuit 71 establishes a threshold for an acceptable signal-to-noise ratio. When the threshold is exceeded, the output of the Schmitt trigger 71 is applied to the base of the switching transistor 72, which in turn enables the loop filter 32. Removing the disablement of loop filter 32 completes the phase-locked loop allowing the receiver to track the incoming signal. If phase lock is maintained until the thresholds of the sweep level circuit 36 are exceeded, an output pulse is applied to the logic and display circuitry 40. The storage and display logic circuit 40 is enabled to sample the output of the sweep threshold circuit 36 only during a limited period corresponding to the end of a sweep signal (time $t_1$). This circuitry 40 is driven by the clock 24 and includes a conventional divider and matrix circuit 80 for applying clock pulses to a storage register and gate assembly 81 of well-known design. The register and gate assembly 81 sequentially enables the gates 56 of FIG. 6, thereby energizing the first local oscillators 54*a–n* in sequence and simultaneously completing the signal path to the corresponding lamp driver circuits 82*a* to 82*n*. The trigger pulse from the sweep threshold circuit 36 reaching the storage register and gate assembly 81 passes through a conducting gate of gate assembly 81 to its appropriate lamp driver circuit 82*a–n* lighting the lamp corresponding to the channel under test.

If phase lock is lost before the storage register and gates 81 are enabled by monostable multivibrator 37, then the sweep threshold is lost and no output pulse occurs.

The storage register and gates 81 are designed to hold any energized lamp on for the entire sampling period for all channels, e.g. 80 seconds. Therefore, during the operation of the system, a channel into which the evaluation signal is injected and detected is registered as usable by the lighted lamp. The lamp will remain lighted as long as each sequential evaluation signal over that channel is detected.

In use, the operator at the receiving station merely monitors the display board during transmission and can indicate by voice or other means to the transmitting station which channels are usable. Any channel or midband fading during transmission is immediately apparent to the receiver operator who can direct a change of channel without any significant loss of communications contact.

The foregoing is a description of one embodiment of our invention. It is recognized that one skilled in the art can devise variations from the specific form in which our invention is illustrated. In accordance with the Patent Laws of the United States, the rights granted thereunder are not limited to the specific embodiment illustrated, but rather to the scope of the following claims and their equivalents.

What is claimed is:

1. In a communications system including a transmitter of modulated signals and a receiver therefor, means to indicate channel usability, comprising:

at the transmitter, a generator of an evaluation signal having a time-varying frequency and a duration short in comparison with the modulation;

means to intersperse the evaluation signal of said generating means in the modulation; and, at the receiver, means for isolating the evaluation signal from the modulation;

a first circuit responsive to said isolating means to generate a signal indicating evaluation signal amplitude in excess of a predetermined amplitude;

a second circuit responsive to the signal from said first circuit and said isolating means to generate a signal indicating evaluation signal amplitude in excess of a predetermined amplitude throughout the duration of the evaluation signal period; and an indicator responsive to the signal from said second circuit.

2. The combination of claim 1 wherein the evaluation signal generated by said generator is in the modulation bandwidth of the communications system.

3. The combination of claim 2 wherein the frequency of the evaluation signal of said generator extends substantially across the modulation bandwidth of the communications systems.

4. The combination of claim 1 wherein said interspersing means includes a gating network for selecting between the modulation and the evaluation signal of said generator for exciting the transmitter; and a timing circuit for energizing said gating network.

5. The combination of claim 4 wherein the transmitter and receiver are capable of operating at a plurality of carrier frequencies sequentially and said timing circuit energizes said gating network once each carrier frequency step in the sequence.

6. The combination of claim 4 wherein said timing circuit energizes said gating network to pass the evaluation signal of said generator for periods of substantially short duration with reference to periods for which said timing circuit energizes said gating network to pass the modulation.

7. The combination of claim 1 wherein said first circuit includes a phase-locked loop demodulator to identify the evaluation signal.

8. The combination of claim 7 wherein said second circuit includes a phase-locked loop demodulator operative throughout the duration of the evaluation signal period.

References Cited

UNITED STATES PATENTS 3,271,681 9/1966 McNair ------------- 325—50

FOREIGN PATENTS 679,073 1/1964 Canada.

ROBERT L. GRIFFIN, Primary Examiner

A. J. MAYER, Assistant Examiner

U.S. Cl. X.R.

325—56, 64, 302, 304